(12) United States Patent
Becoulet et al.

(10) Patent No.: US 11,506,130 B2
(45) Date of Patent: Nov. 22, 2022

(54) AIRCRAFT TURBOMACHINE WITH REDUCTION GEAR

(71) Applicant: SAFRAN AIRCRAFT ENGINES, Paris (FR)

(72) Inventors: Julien Fabien Patrick Becoulet, Moissy-Cramayel (FR); Alexandre Jean-Marie Tan-Kim, Moissy-Cramayel (FR); Nicolas Auguste Marcel Pommier, Moissy-Cramayel (FR); Arnaud Nicolas Negri, Moissy-Cramayel (FR); Michel Gilbert Roland Brault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 46 days.

(21) Appl. No.: 16/954,355

(22) PCT Filed: Dec. 20, 2018

(86) PCT No.: PCT/FR2018/053443
§ 371 (c)(1),
(2) Date: Jun. 16, 2020

(87) PCT Pub. No.: WO2019/122740
PCT Pub. Date: Jun. 27, 2019

(65) Prior Publication Data
US 2021/0087977 A1 Mar. 25, 2021

(30) Foreign Application Priority Data

Dec. 22, 2017 (FR) ...................................... 1763045

(51) Int. Cl.
*F02C 7/36* (2006.01)
*F02C 7/06* (2006.01)
(Continued)

(52) U.S. Cl.
CPC .................. *F02C 7/36* (2013.01); *F02C 7/06* (2013.01); *F01D 25/164* (2013.01); *F02C 7/32* (2013.01);
(Continued)

(58) Field of Classification Search
CPC ...... F02C 7/36; F02C 7/06; F02C 7/32; F02C 3/10; F02C 3/107; F16C 1/08;
(Continued)

(56) References Cited

U.S. PATENT DOCUMENTS 5,433,674 A * 7/1995 Sheridan .................... F01D 5/02
475/346
5,580,183 A * 12/1996 Brackoneski ........... F01D 5/026
403/359.1
(Continued)

FOREIGN PATENT DOCUMENTS

| EP | 3179056 | A2 | 6/2017 | |
| FR | 2979121 | A1 | 2/2013 | |
| FR | 2979121 | A1 * | 2/2013 | ............. B64C 11/48 |

OTHER PUBLICATIONS

Written Opinion of the International Searching Authority dated May 4, 2020, issued in corresponding International Application No. PCT/FR2018/053443, filed Dec. 20, 2018, 7 pages.
(Continued)

*Primary Examiner* — Brian P Wolcott
*Assistant Examiner* — Joshua R Beebe
(74) *Attorney, Agent, or Firm* — Christensen O'Connor Johnson Kindness PLLC

(57) ABSTRACT

An aircraft turbomachine with a reduction gear has a first shaft and a second shaft having one same axis of rotation, the second shaft being rotationally driven by the first shaft via the reduction gear, the first shaft having elastically deformable means having bellows section(s) and being connected
(Continued)

to the reduction gear by a connecting system likewise having elastically deformable means involving a hairpin or bellows section(s).

21 Claims, 6 Drawing Sheets

(51) Int. Cl.
*F01D 25/16* (2006.01)
*F02C 7/32* (2006.01)
*F02K 3/06* (2006.01)

(52) U.S. Cl.
CPC .......... *F02K 3/06* (2013.01); *F05D 2220/323* (2013.01); *F05D 2240/50* (2013.01); *F05D 2240/62* (2013.01); *F05D 2260/40311* (2013.01); *F05D 2260/98* (2013.01)

(58) Field of Classification Search
CPC ........ F16H 57/00; F16H 57/0006; F01D 5/02; F01D 5/026; F01D 25/164; F01D 25/16; F02K 3/06; F05D 2220/323; F05D 2240/50; F05D 2240/60; F05D 2240/62; F05D 2230/53; F05D 2260/40311; F05D 2260/98

See application file for complete search history.

(56) References Cited

U.S. PATENT DOCUMENTS

| | | | | |
|---|---|---|---|---|
| 6,223,616 | B1 * | 5/2001 | Sheridan | F16H 57/0482 74/468 |
| 9,145,847 | B2 | 9/2015 | Gallet et al. | |
| 9,541,007 | B2 * | 1/2017 | McCune | F01D 5/06 |
| 10,094,335 | B2 * | 10/2018 | Ertas | F02K 3/06 |
| 10,151,249 | B2 * | 12/2018 | Venter | F01D 15/12 |
| 10,202,905 | B2 * | 2/2019 | Venter | F02C 7/36 |
| 2010/0150702 | A1 * | 6/2010 | Sheridan | F01D 5/066 415/170.1 |
| 2012/0023747 | A1 * | 2/2012 | Slayter | F02C 7/36 29/893.1 |
| 2012/0260623 | A1 * | 10/2012 | McCune | F01D 5/06 60/226.1 |
| 2014/0116061 | A1 * | 5/2014 | Barnett | F16D 1/101 60/772 |
| 2016/0097330 | A1 * | 4/2016 | Venter | F02C 3/04 415/122.1 |
| 2016/0097331 | A1 * | 4/2016 | Venter | F16C 27/045 415/122.1 |
| 2017/0159608 | A1 * | 6/2017 | Ertas | F02K 3/06 |
| 2017/0159798 | A1 * | 6/2017 | Sheridan | F01D 25/18 |
| 2018/0100563 | A1 * | 4/2018 | Grubba | F01D 5/026 |
| 2019/0345876 | A1 * | 11/2019 | Gou | F02K 3/06 |

OTHER PUBLICATIONS

International Preliminary Report on Patentability dated Jun. 23, 2020, issued in corresponding International Application No. PCT/FR2018/053443, filed Dec. 20, 2018, 7 pages.

International Search Report dated Apr. 30, 2019, issued in corresponding International Application No. PCT/FR2018/053443, filed Dec. 20, 2018, 5 pages.

Written Opinion of the International Searching Authority dated Apr. 30, 2019, issued in corresponding International Application No. PCT/FR2018/053443, filed Dec. 20, 2018, 6 pages.

* cited by examiner

AIRCRAFT TURBOMACHINE WITH REDUCTION GEAR

TECHNICAL FIELD

This invention relates to an aircraft turbomachine with reduction gear.

BACKGROUND

A turbomachine, such as a dual-flow turbojet engine, conventionally comprises an air inlet with a fan, the outlet airflow of which divides into an airflow that enters the engine and forms a hot flow or primary flow, and an airflow that flows around the engine and forms a cold flow or secondary flow.

The engine typically comprises from upstream to downstream, in the direction of gas flow, at least one compressor, a combustion chamber, at least one turbine, and an exhaust nozzle in which the combustion gases leaving the turbine and forming the primary flow are mixed with the secondary flow. A turbomachine may also be of the "double-body" type, which means that it comprises two rotors arranged coaxially. A first body is called a low pressure body and a second body is called a high pressure body. In this case, the engine is known to have, from upstream to downstream, a low-pressure compressor, a high-pressure compressor, the combustion chamber, a high-pressure turbine and a low-pressure turbine.

In the case of a turbomachine with reduction gear, the turbine shaft drives the fan shaft via the reduction gear, which is lubricated and housed in a lubrication enclosure. According to the reduction gear type used, planetary or epicyclic, the fan shaft will rotate in the same or opposite direction to the turbine shaft, and the fan shaft will rotate at a lower speed than that of the turbine shaft.

The turbine shaft, which is the low-pressure turbine shaft in the case of a double body turbomachine, is usually coupled to a shaft of the low-pressure compressor, which is itself coupled to an input shaft of the reduction gear. This input shaft passes through the reduction gear and meshes with a sun gear of the latter.

In order to ensure the proper functioning of this low-pressure shaft line and in particular of the reduction gear, it is necessary to transmit torque but, at the same time, to obtain a certain flexibility in the input shaft of the reduction gear so as not to disturb the operation of this shaft line and the internal elements of the reduction gear, but also to ensure proper alignment of the internal elements of the reduction gear.

The flexibility values of the input shaft can be very high and the solution originally envisaged was to make bellows on the shaft. However, in order to respect such high flexibility values, it would have been necessary to provide several adjacent bellows, which would have resulted in radial and axial dimensions too large and would prohibit its integration into the turbomachine.

A variant described in the document FR-A1-2 979 121 consists in making the input shaft more flexible by attaching it to its drive shaft by means of one or more flex coupling type fasteners. Each fasteners comprises two annular parts of L-shaped cross-section, the radial legs of which are spaced apart and fastened to each other by peripheral annular flanges. This solution is also radially cumbersome.

This invention provides a simple, effective and cost-effective solution to this problem by means of an optimised connection system between two shafts or shaft portions.

DISCLOSURE OF THE INVENTION

The invention provides an aircraft turbomachine with reduction gear, comprising a first shaft and a second shaft having the same axis of rotation, the second shaft being driven in rotation via a reduction gear by the first shaft, the first shaft comprising first elastically deformable means giving it a certain flexibility in operation, said deformable means comprising at least one first annular bellows extending around said axis, characterised in that the first shaft comprises a portion coupled to the reduction gear by a connecting system comprising an input shaft, the input shaft comprising first splines for coupling to the reduction gear and second splines for coupling to third splines complementary to said portion of said first shaft, the portion of said first shaft having a generally tubular shape around said axis, and comprising a downstream part comprising said at least one first bellows and a substantially cylindrical upstream part which is surrounded by said input shaft, said input shaft comprising at least one annular part which extends around said axis and which has a substantially U- or C-shaped cross-section and defines an annular opening around said axis, said annular part forming second elastically deformable means giving it a certain flexibility in operation.

The invention thus proposes to benefit from the combined advantages of two technologies to confer flexibility on the connection system. The annular part with a C or U section confers flexibility and makes it possible to limit the size of the system. When the opening is oriented axially, the annular part forms a hairpin and confers a flexibility in the radial direction with respect to the axis. When the opening is oriented radially, the annular part forms another bellows. The bellows(s) provide flexibility in the axial direction and in bending. The invention thus proposes to integrate two elastically deformable means, respectively to the first shaft and to the input shaft of the reduction gear. The first shaft is, for example, a low pressure turbine or compressor shaft in the case mentioned above.

The turbomachine according to the invention may comprise one or more of the following features, taken in isolation from one another or in combination with one another:
- said annular part with a U-shaped cross-section defines an annular opening which opens in the axial direction,
- said at least one first bellows extends radially between a diameter substantially equal to that of said third splines and a diameter substantially equal to that of said first splines,
- said input shaft comprises an external annular leg for coupling to said reduction gear, and an internal annular leg for coupling to the upstream part of said first shaft; the deformable means are therefore carried by both shafts, the hairpin being formed by the input shaft and the first bellows(s) being carried by the second shaft (the shaft of the low-pressure compressor in the above-mentioned example);
- the legs are connected to each other by an annular web having a thinning in thickness at its connection to the said external leg;
- the external leg has a downstream end located near an upstream end of said at least one first bellows, and/or a diameter which is greater than an external diameter of said at least one first bellows; this configuration makes it possible to limit the dimensions, in particular axial, of the connection system;

at least one part of said at least one first bellows is surrounded by said external leg, to further limit the size of the system;

the inner leg extends upstream beyond the web and carries external annular sealing elements which cooperate by labyrinth effect with the inner periphery of an annular cowl carried by said second shaft; this cowl can participate in the sealing of the lubrication chamber in which the reduction gear is housed;

the number of first bellows is greater than two;

said hairpin is located on one side of said reduction gear and said at least one bellows is located on the other side of said reduction gear and/or passes axially through said reduction gear;

the connection system comprises a portion of said first shaft and an input shaft having first splines for coupling this portion to the reduction gear;

said substantially cylindrical upstream part comprises second splines for coupling to said input shaft;

said at least one bellows extends radially between a diameter substantially equal to that of said first splines and a diameter substantially equal to that of said second splines;

said first shaft is a low pressure compressor shaft;

said annular part with U-shaped cross-section defines an annular opening which opens radially inward, this annular part forming a second bellows;

the first bellows is located downstream of the reduction gear, and the second bellows is located upstream of the reduction gear;

said annular part is an intermediate axial part of the input shaft which comprises an upstream cylindrical part comprising said second splines and a downstream cylindrical part comprising said first splines;

at least some of said splines comprise curved side faces, said side faces extending between the longitudinal ends of said splines;

at least some of said splines have their longitudinal ends truncated by machining to give them a curved profile; and the or each bellows comprises an annular bottom which comprises a plurality of oil passage orifices in operation.

This invention also relates to a method of mounting a turbomachine as described above, comprising the steps of:

connecting said second shaft, which is a fan shaft, to an output shaft of said reduction gear and axially engaging, on said fan shaft, bearings and their support, engaging an input shaft axially inside said reduction gear until splines of said shaft cooperate with the first splines of a sun gear of the reduction gear, mounting this assembly in an intermediate casing and secure it to this casing by suitable means, mounting means for supplying oil to said bearings, and engaging said first shaft by axial translation into said input shaft until they are coupled by the second and third splines and fixing said support of the bearings to the intermediate casing.

DESCRIPTION OF FIGURES

The invention shall be better understood and other details, features and advantages of the invention shall appear when reading the following description made by way of non-limitative example and with reference to the annexed drawings in which.

DETAILED DESCRIPTION

Figure 1:
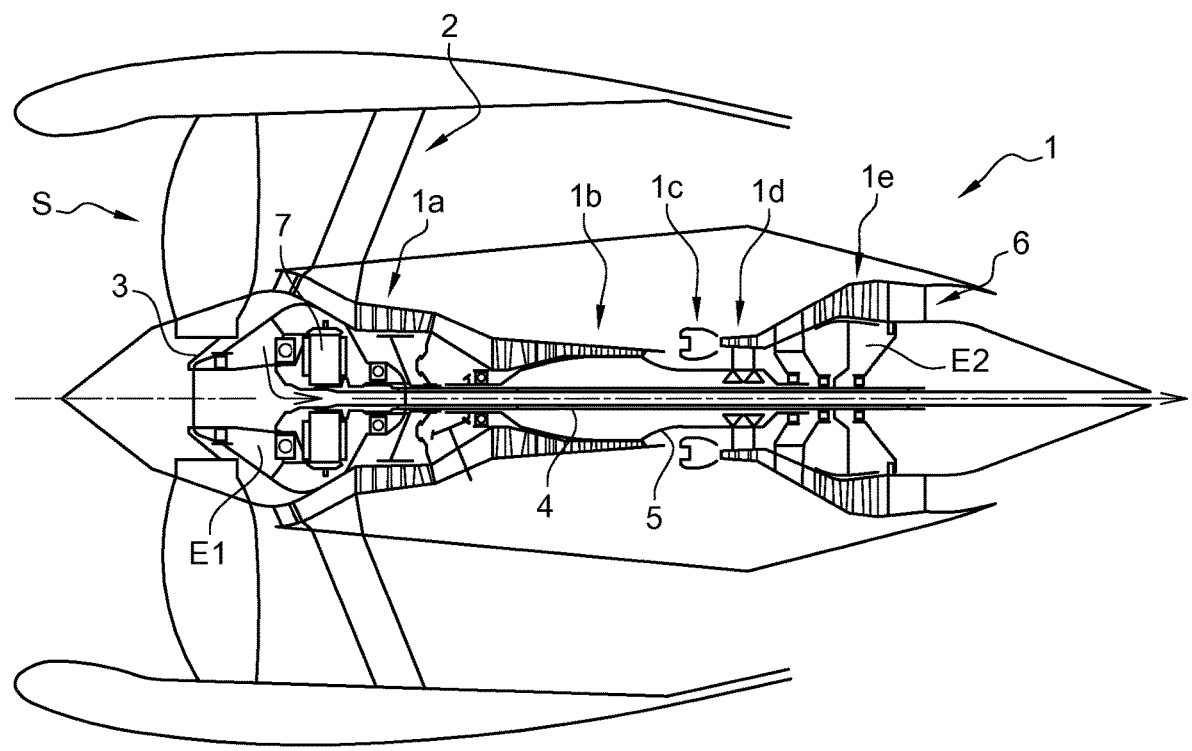
FIG. 1 is a schematic axial cross-sectional view of an aircraft turbomachine with reduction gear.

Referring to FIG. 1, we see a turbomachine 1 with reduction gear, which conventionally consists of a fan S, a low-pressure compressor 1a, a high-pressure compressor 1b, a combustor chamber 1c, a high-pressure turbine 1d and a low-pressure turbine 1e. The rotors of the high-pressure compressor 1b and of the high-pressure turbine 1d are connected by a high-pressure shaft 5 and form a high-pressure (HP) body with it.

The rotors of the low-pressure compressor 1a and the low-pressure turbine 1e are connected by a low-pressure shaft 4 and form a low-pressure (LP) body. The shaft 3 of the fan S is driven via a reduction gear 7 by the LP shaft 4.

The HP 5 and LP 4 shafts extend along an axis which is the axis of rotation of the turbomachine 1. In the rest of the description, the notions of longitudinal or radial, and inside or outside, are relative to this axis and the notions of upstream and downstream refer to the flow of gases in the turbomachine.

The turbomachine 1 comprises structural casings. The HP body is held by two structural casings: the inter-compressor casing and the inter-turbine casing, and the LP body is held by at least two structural casings: the intermediate casing 2 and the inter-turbine casing and/or the exhaust casing 6.

The intermediate casing 2 supports bearings of the LP turbine shaft 4 which are housed in a front or upstream enclosure marked E1. The exhaust casing 6 supports bearings of the LP turbine shaft 4 which are housed in a rear or downstream enclosure marked E2.

Figure 2:
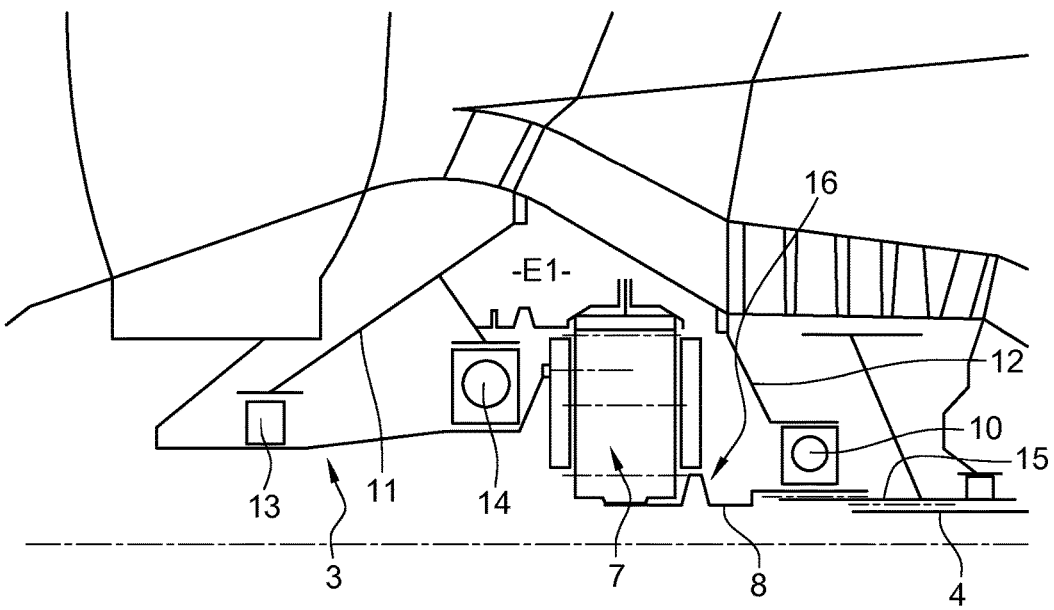
FIG. 2 is a half schematic view on a larger scale of a part of FIG. 1 and represents the technique prior to the invention.

The reduction gear 7 is here of the epicyclic type. FIG. 2 shows the dimensions of the reduction gear very schematically. The reduction gear 7 comprises an input shaft 8 extending upstream of the LP 4 shaft and which is guided by a downstream bearing 10.

More precisely, the input shaft 8 comprises an axial end, here upstream, which is engaged in the reduction gear 7 and meshed with a sun gear of the reduction gear, which in turn is meshed with the planet gears of the reduction gear. The input shaft 8 has its downstream end engaged with the shaft 15 of the low pressure compressor which is itself engaged with the shaft 4. The bearing 10 extends here around the shaft 15.

The output torque of the reduction gear 7 is transmitted to the fan shaft 3 via a conventional connection, e.g. by fastening this fan shaft to the planet carrier forming an output shaft of the reduction gear, in the case of an epicyclic reduction gear. In the case of a planetary reduction gear, the fan shaft would be driven by the ring gear. The reduction gear is placed inside the front lubrication enclosure E1.

The enclosure E1 consists of fixed and movable walls. The fixed walls of the enclosure E1 comprise an inner wall of the primary flow path, an upstream bearing support 11 and a downstream bearing support 12. The supports 11 and 12 extend towards the inside of the turbomachine and carry the bearings 13 and the bearing 10 respectively. They provide the structure between the casings and the fixed external rings of the bearings. The moving walls of the enclosure E1 comprise the inlet shaft 8 and fan shaft 3. The bearings 10, 13, 14 are housed in the enclosure E1. Seals, not visible in the diagrams, are provided between the fixed and movable walls and are e.g. labyrinth joints, brush joints, segmented radial joints, etc.

The bearings 10, 13 and 14 as well as the reduction gear 7 are lubricated for proper operation. The oil is supplied by suitable means such as nozzles, oil supply ducts, etc. The bearing support 11 has ventilation holes which allow ventilation air to pass through from the enclosure. The enclosure E1 is configured so that the air-oil mixture, which forms an oil mist inside the enclosure, is contained therein. Between the rotor and stator walls of the enclosure, for example here at the upstream and downstream ends of the enclosure, seals (such as labyrinths) are placed to contain the oil, and an air circuit pressurizes these seals to prevent oil leakage. The sealing means can be between a movable wall and a fixed wall of the enclosure or between two movable walls, as in the case of a seal between two shafts, and in particular between the shafts 3, 8 (visible in FIG. 3). A gas flow is taken from the LP or HP compressor of the turbomachine and feeds all the seals of the enclosure E1.

The enclosure E1 is then pressurised (air is continuously entering therein, pushing back the oil that may have escaped from the seals by capillary action) and the bearings operate in a mixed oil and air environment. The oil remains contained in the lubrication circuit. The supply of the bearings are provided by a supply tube 25 and the recovery is ensured by a specific recovery tube generally located at a low point in the enclosure. To avoid overpressure in the enclosure, and to allow a constant flow of incoming air, the inside of the enclosure is pressurised with air at a lower pressure than the pressure of the air entering the seals. This air loaded with oil particles, which is evacuated at the level of a pressure well, must first be treated to recover almost all of the oil it carries. To do this, the oiled air will be brought to an oil separator which will separate the air from the oil it carries and discharge the reject the oil-free air outside the engine. This is the principle of removing oil from an enclosure.

FIG. 2 represents the technique prior to the invention in which the input shaft 8 of the reduction gear 2 comprises elastically deformable means, here with bellows 16, giving a certain flexibility to the shaft 8 and thus to the connection system between the shafts 4, 15 and the reduction gear 7.

However, in order to respect the high flexibility values of the shaft 8, it would be necessary to provide several adjacent bellows, which would result in excessive radial and axial dimensions and would prohibit its integration in the turbomachine.

Figure 3:
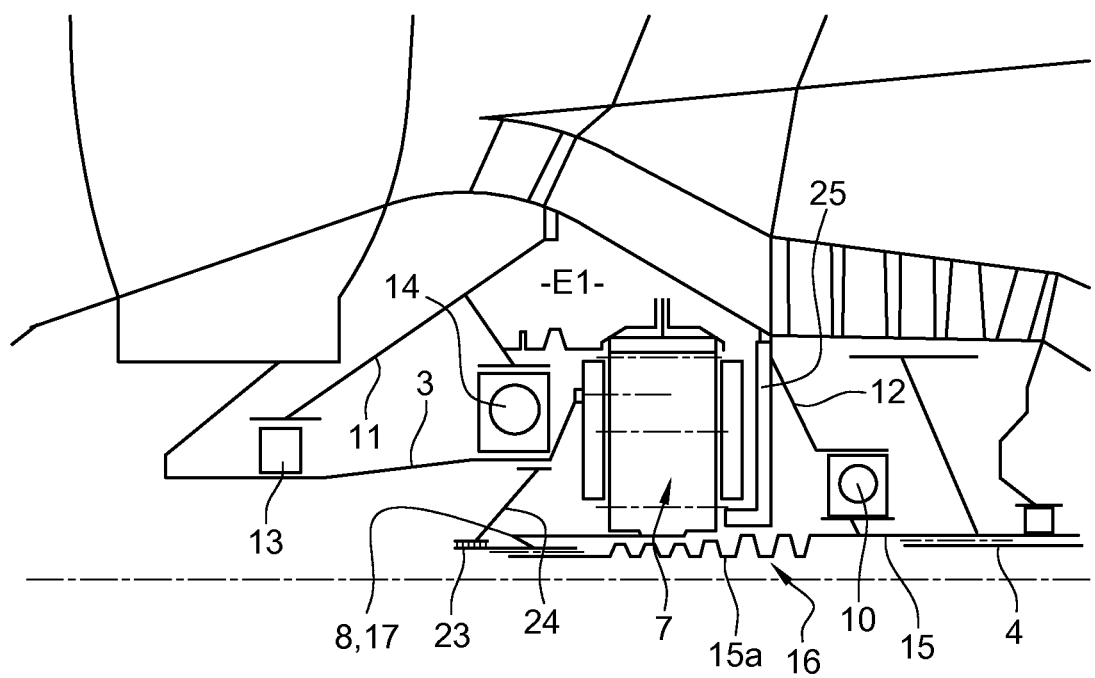
FIG. 3 is a view similar to that of FIG. 2 and represents a schematic embodiment of the invention.

FIG. 3 illustrates an embodiment of the invention in which the connection system between the shafts 4, 15 and the reduction gear 7 comprises deformable means with bellows 16 and hairpin 17.

The bellow(s) 16 are here carried by a shaft portion 15a of the shaft 15, which is advantageously formed in one piece with the latter. The hairpin 17 is formed by the input shaft 8 and extends radially between the shaft portion 15a and the reduction gear 7.

The bellows 16 can extend on one side of the reduction gear 7, here downstream, and the hairpin connection can extend on the other side of the reduction gear, here upstream. As can be seen in FIG. 3, the bellows can extend partly radially inside the reduction gear 7.

Figure 4:
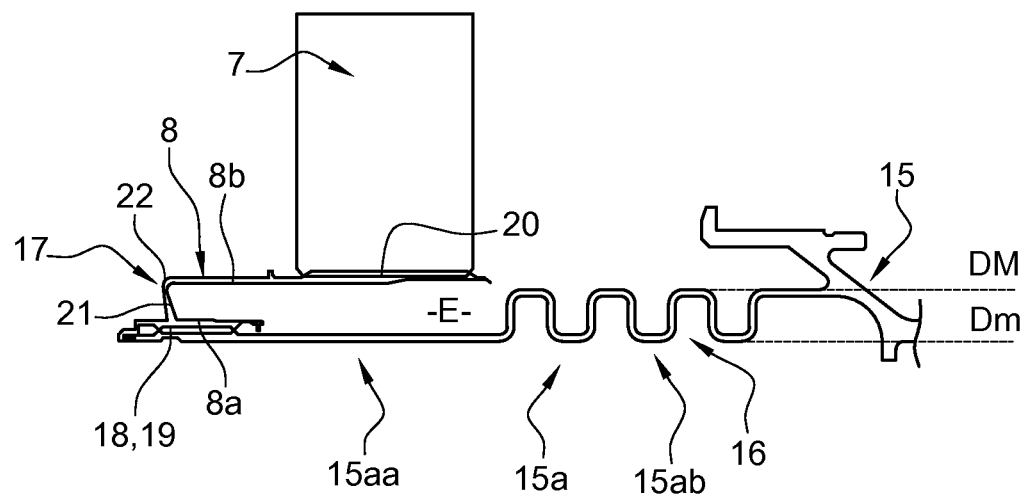
FIG. 4 is a larger scale view of part of FIG. 3 and illustrates a more concrete example of the embodiment of the invention.

Reference is now made to FIG. 4, which represents a more concrete example of the embodiment of the invention.

The portion 15a of the shaft 15 has a generally tubular shape around the axis of the turbomachine, and comprises a downstream part 15ab comprising the bellows(s) 16 and a substantially cylindrical upstream part 15aa which is at least partly surrounded by the input shaft 8. This upstream part 15aa comprises at an upstream end of the coupling splines 18 which are engaged in complementary coupling splines 19 of the input shaft 8.

In the example shown, the number of bellows 16 is greater than two. The bellows are preferably identical.

The portion 15a comprises an external diameter defined by the maximum diameter DM of the bellows 16, and an internal diameter defined by the minimum diameter Dm of these bellows. The downstream part 15ab is connected to the rest of the shaft 15 by a cylindrical wall of maximum diameter DM, and the upstream part 15aa has a diameter Dm.

The input shaft 8 comprises an external annular leg 8b for coupling to the reduction gear 7, and an internal annular leg 8a for coupling to the portion 15a of the shaft 15. The external leg 8b thus comprises splines 20 for coupling to the sun gear of the reduction gear and its internal leg 8a comprises the above-mentioned splines 19.

The legs 8a, 8b are connected to each other by an annular web 21 located upstream and having a thinning of thickness 22 at the level of its connection to the external leg 8a. The web 21 may have a radial cross-sectional orientation, extending from the downstream to the upstream radially outwards.

As shown in the drawings, the external leg 8b has a downstream end located near an upstream end of the bellows 16. This external leg 8b has a diameter which is larger than the diameter DM. In the case where the number of bellows 16 is large, as in the example shown, or if these bellows have a large cumulative axial dimension, they can be housed at least partly in the annular space E bounded by the external leg 8b.

Preferably, the internal leg 8a extends the upstream beyond the web 21 and carries external annular sealing elements 23 which cooperate by labyrinth effect with the internal periphery of an annular cowl 24 carried by the fan shaft 3 (see FIG. 3). The sealing elements 23 thus form the sealing means of the enclosure E1, here between the shafts 3 and 8.

Reference is now lade to FIGS. 5 to 9, which show the mounting steps of the turbomachine.

Figure 5:
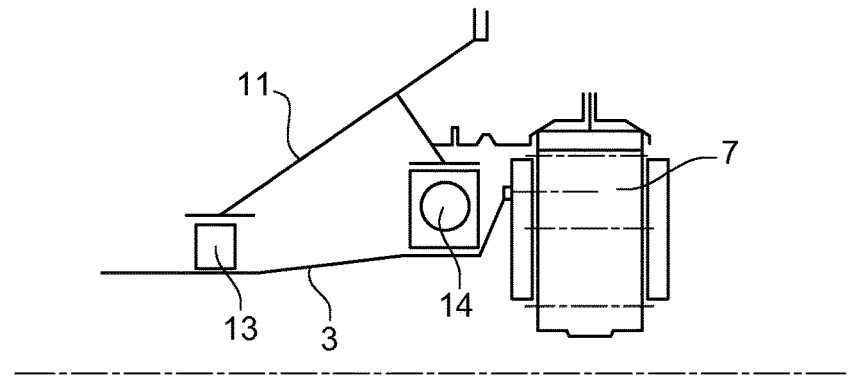
FIGS. 5 to 9 are similar views to FIG. 3 and illustrate steps in the mounting of the turbomachine.

The first step illustrated in FIG. 5 consists of connecting the fan shaft 3 to the output shaft of the reduction gear and axially engaging 11 on the fan shaft the bearings 13, 14 and their support 11.

Figure 6:
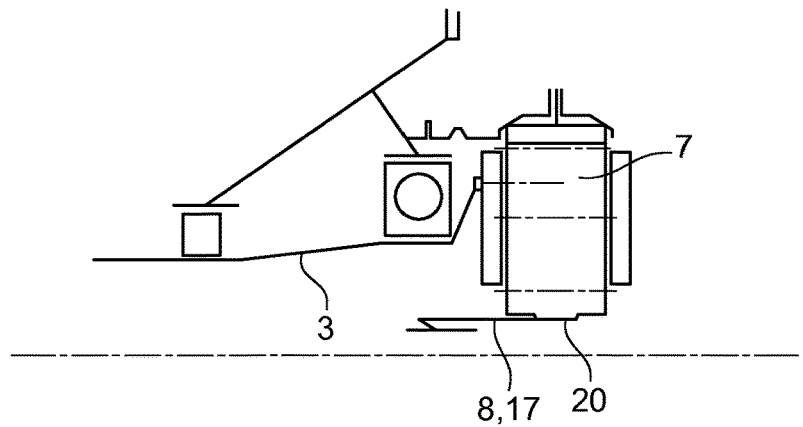

The input shaft 8 of the reduction gear is then engaged axially inside the reduction gear until its splines 20 cooperate with those of the sun gear of the reduction gear (FIG. 6).

Figure 7:
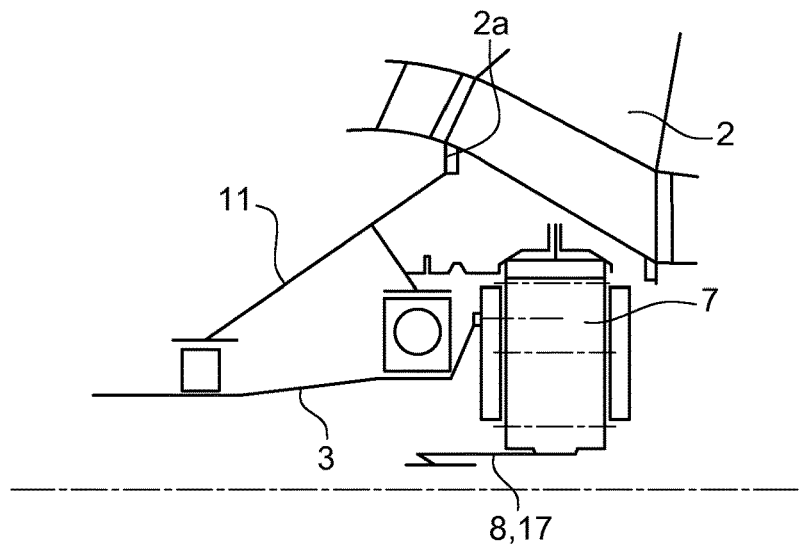

The assembly is then mounted in the intermediate casing 2 of the turbomachine and secured to this casing by suitable means, e.g. by means of flanges 2a and a set of screw nuts (FIG. 7).

Figure 8:
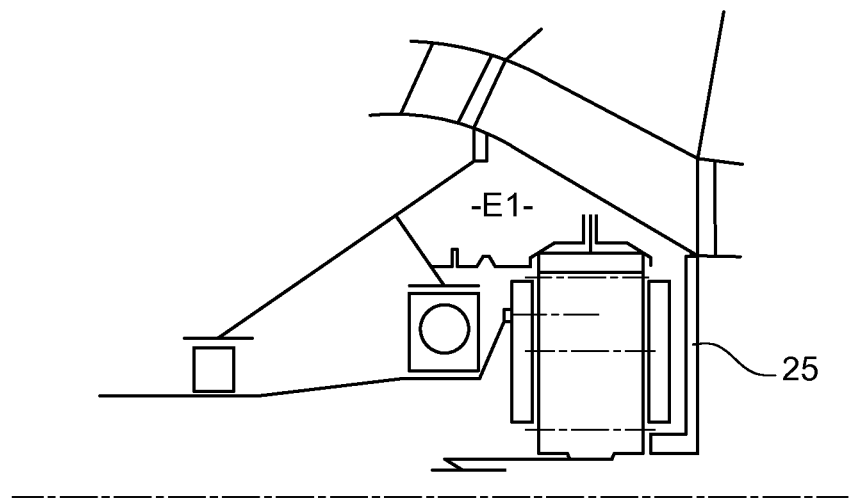

The means 25 for supplying oil to the lubrication enclosure E1 of the reduction gear 7 are then fitted (FIG. 8).

Figure 9:
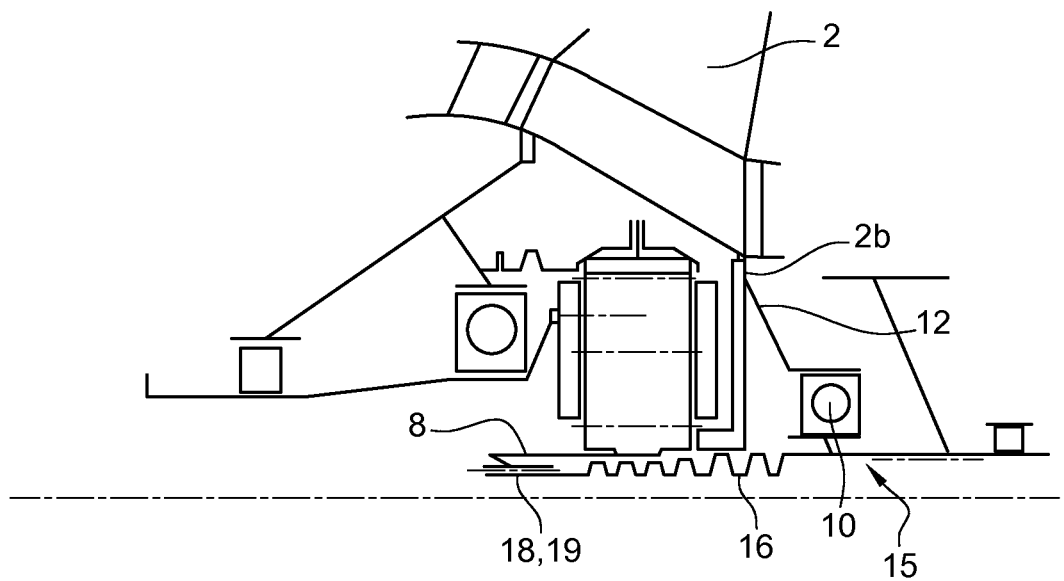

Finally, the shafts 4 and 15 are engaged by axial translation from downstream, the shaft 15 being intended to be engaged in the shaft 8 until their splines 18, 19 engage in one another. The bearing support 12 is then attached to the intermediate casing 2 by suitable means, e.g. by means of flanges 2b and a set of screw nuts (FIG. 9).

The deformable means according to the invention provide the connection system between the shafts 4, 15 and the reduction gear 7 with optimised flexibility, in particular in the axial, radial and bending directions. By way of example, the radial flexibility can be of the order of $2 \times 10^{-8}$ m/N to $2.10^{-5}$ m/N and preferably $2.10^{-6}$ m/N, and the angular flexibility of the order of $4.10^{-5}$ to $3.10^{-7}$ and preferably $3 \times 10^{-6}$ rad/N.m.

FIGS. 10 to 13 illustrate an alternative embodiment of the invention in which the elements already described in the foregoing are designated by the same references.

The shaft 15 comprises a single bellows 16, the annular base 16a of which is pierced with orifices 30 for the passage of lubricating oil during operation. The downstream end of the shaft 15 has splines 32 for coupling to a support trunnion 15c of the bearing 10, this trunnion being coupled by splines 34 to the LP shaft 4.

The upstream end of the shaft 15 comprises splines 18. The splines 18 are located between, on the upstream side, a screw thread of a nut 35 and, on the downstream side, an external cylindrical centering surface 36. A similar external cylindrical surface 38 may be located on the shaft 15 just upstream of the splines 32.

The bellows 16 extends radially between the diameters Dm and DM, with splines 18 and 32 located approximately at the level of the diameter Dm.

The hairpin of the shaft 8 is replaced here by a bellows 40, the annular bottom 40a of which is pierced with lubrication oil passage orifices 42 during operation. The downstream end of the shaft 8 comprises the splines 20 and the upstream end comprises the splines 19.

The shaft 8 is coaxially engaged on the shaft 15 by axial translation from the upstream until the splines 18, 19 are engaged in each other. The surface 36 is then in contact with an internal cylindrical surface of the shaft 8, located here upstream of the bellows 40. In addition, the surface 38 abuts an inner cylindrical surface of the trunnion 15c. The nut 35 is then screwed onto the thread of the shaft 15 and is supported axially on the shaft 8 to hold it securely on the shaft 15.

Figure 13:
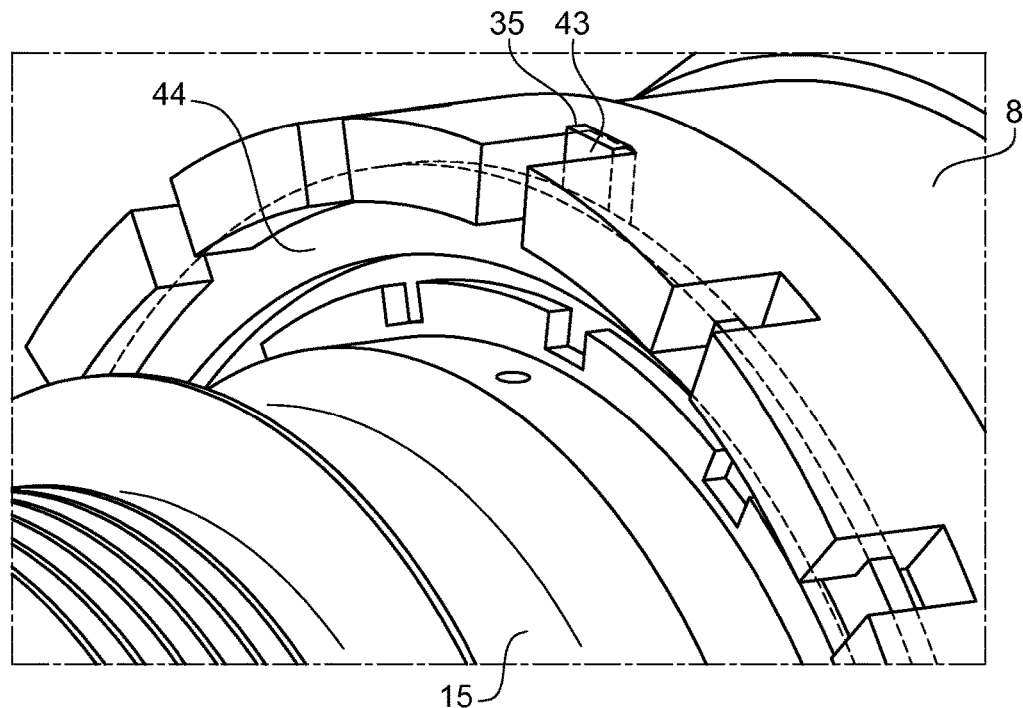
FIG. 13 is a partial schematic perspective view of a detail of the embodiment of FIG. 10.

As shown in FIG. 13, a lock washer 43 and a locking ring 44 are then fitted to the shaft 15. The lock washer 43 interlocks with the nut 35 to prevent accidental loosening of the nut 35 and the locking ring 44 axially locks the lock washer 43 on the shaft 15.

The splines 18, 19, 20 or even 32 and 34 preferably comprise truncated longitudinal ends which can be produced by grinding, for example. The splines are preferably curved, i.e. their side faces, extending axially between their longitudinal ends, have a convexity, as can be seen in FIG. 11a.

The curved shape of the splines gives them a certain freedom of movement by swivelling, limiting the stresses in the splines.

Figure 10:
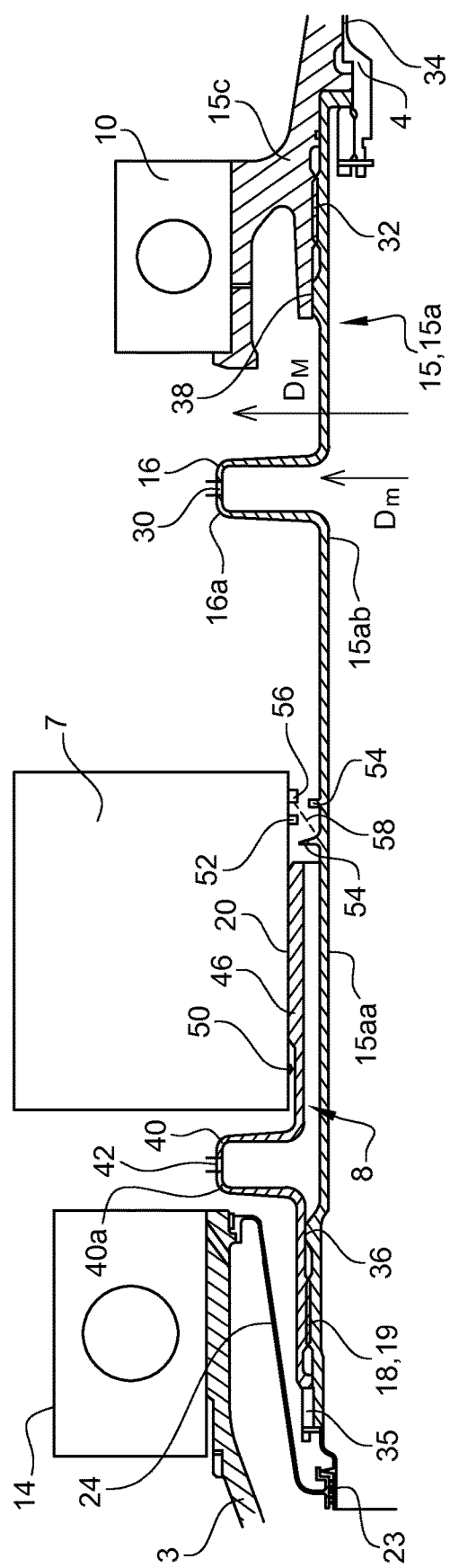
FIG. 10 is a view similar to that of FIG. 2 and represents a schematic embodiment of the invention.
Figure 11:
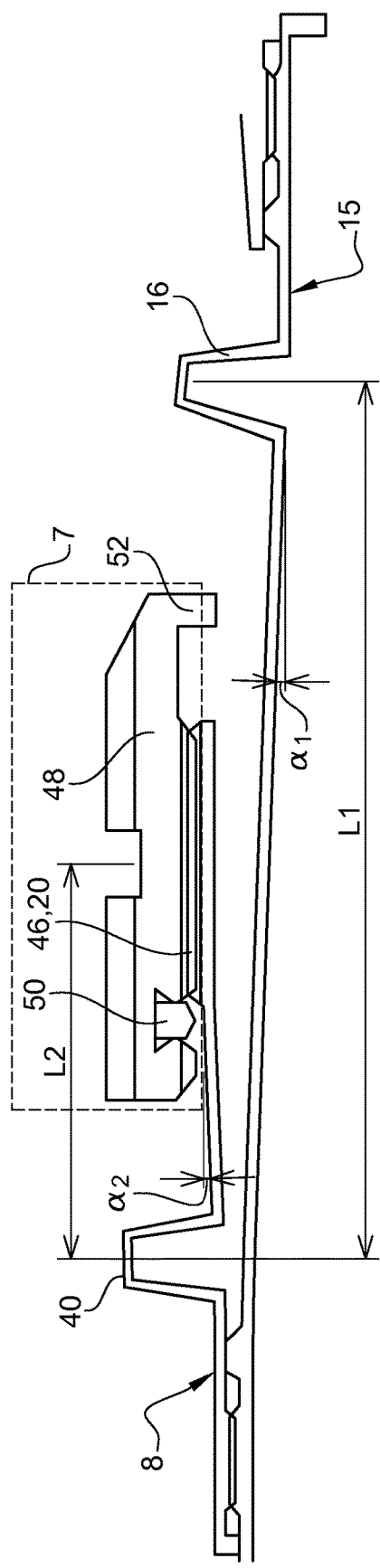
FIG. 11 is a schematic view of the alternative embodiment of FIG. 10.
Figure 11A:
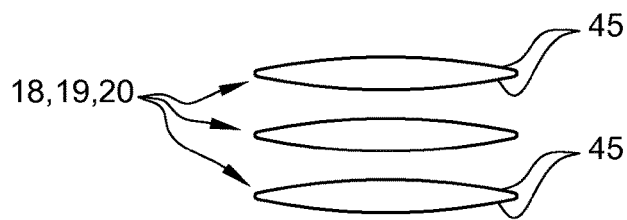
FIG. 11a is a detailed view of splines of the alternative embodiment of FIG. 10.

The splines 20 cooperate with complementary splines 46 of a sun gear 48 of the reduction gear 7, these splines 46 being interrupted by an annular groove in which an annular joint 50 is housed (FIG. 11). The groove and the joint 50 are located close to the upstream end of the sun gear 48. The downstream end of the sun gear 48 comprises at least one annular rim 52 facing radially towards the inside and located axially between two annular lips 54 protruding from the shaft 15 (FIGS. 10 and 11).

The reduction gear 7 may carry at least one oil nozzle 56 for projecting a jet of lubricating oil 58 between the two lips 54. The nozzle 56 is located at the downstream and radially inner end of the reduction gear 7.

Figure 12:
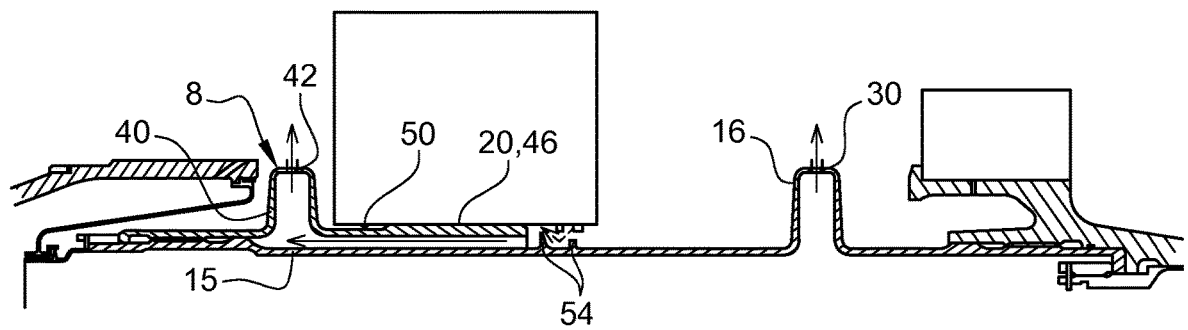
FIG. 12 is a view similar to that of FIG. 10 and showing the lubricating oil circulation.

FIG. 12 shows the oil flow during operation.

The oil thrown between the lips 54 is centrifuged and thrown towards the splines 20, 46. The joint 50 limits the passage of this oil axially upstream. In addition, oil flows into shaft 8 and can escape through the orifices 42 of the bellows 40. In addition, oil flows into the shaft 15 and can escape through the orifices 30 of the bellows 16.

FIG. 11 shows the axial length or dimension L1 between the bellows 16, 40 and the axial dimension L2 between the bellows 40 and the middle of the splines 20, 46 or of the sun gear 48. Increasing the dimension L2 reduces the angle α2 of elastic deformation of the shaft 8 between its cylindrical position in the free state and its deformed position shown in the drawing in which its downstream end is spread radially towards the outside. Increasing the dimension L1 makes it possible to reduce the angle α1 of elastic deformation of the shaft 15, between its cylindrical position in the free state and its deformed position shown in the drawing in which its downstream end is spread radially towards the inside. The curved shape of the splines makes it possible to maintain a coupling of the shafts 15, 8 in these deformed positions. During these deformations, the bellows 16, 40 deform by compressing or expanding.

The invention claimed is:

1. An aircraft turbomachine with a reduction gear, comprising:
a first shaft and a second shaft having a same axis of rotation, the second shaft being driven in rotation via the reduction gear by the first shaft, the first shaft comprising first elastically deformable means comprising at least one first annular bellow extending around the axis of rotation, wherein the first shaft comprises a portion coupled to the reduction gear by a connecting system comprising an input shaft, the input shaft comprising first splines for coupling to the reduction gear and second splines for coupling to third splines complementary to said portion of the first shaft, said second and third splines being located upstream of the reduction gear, said portion of the first shaft having a tubular shape around the axis of rotation, said portion of the first shaft comprising a downstream part comprising the at least one first bellow and a cylindrical upstream part which is surrounded by the input shaft, the input shaft comprising at least one annular part which extends around the axis and which has a U- or C-shaped cross-section and defines an annular opening around the axis, the annular part forming second elastically deformable means.

2. The turbomachine according to claim 1, wherein the at least one annular part with a U- or C-shaped cross-section defines an annular opening which opens in a direction of the axis of rotation.

3. The turbomachine according to claim 1, wherein the at least one first bellow extends radially between a first diameter equal to that of the third splines and a second diameter equal to that of the first splines.

4. The turbomachine according to claim 1, wherein the input shaft comprises an external annular leg for coupling to the reduction gear, and an internal annular leg for coupling to the cylindrical upstream part of the first shaft.

5. The turbomachine according to claim 4, wherein the internal and external annular legs are connected to each other by an annular web having a thinning in thickness at its connection to the external leg.

6. The turbomachine according to claim 4, wherein the external annular leg has at least one of a downstream end located facing an upstream end of the at least one first bellow, or a diameter which is greater than an external diameter of the at least one first bellow.

7. The turbomachine according to claim 4, wherein at least one part of the at least one first bellow is surrounded by the external annular leg.

8. The turbomachine according to claim 4, wherein the inner annular leg extends upstream beyond a web and carries external annular sealing elements which cooperate by labyrinth effect with an inner periphery of an annular cowl carried by the second shaft.

9. The turbomachine according to claim 1, wherein said first elastically deformable means comprise more than two first annular bellows extending around the axis of rotation.

10. The turbomachine according to claim 1, wherein the at least one annular part with a U- or C-shaped cross-section defines an annular opening which opens radially inwards, the at least one annular part forming a second bellow.

11. The turbomachine according to claim 10, wherein the at least one first bellow is located downstream of the reduction gear, and the second bellow is located upstream of the reduction gear.

12. The turbomachine according to claim 10, wherein the at least one annular part is an intermediate axial part of the input shaft which comprises an upstream cylindrical part comprising the second splines and a downstream cylindrical part comprising the first splines.

13. The turbomachine according to claim 1, wherein at least some of the first, second, or third splines have truncated longitudinal ends.

14. The turbomachine according to claim 1, wherein at least some of the first, second, or third splines comprise curved side faces.

15. The turbomachine according to claim 1, wherein the first bellow comprises an annular bottom which comprises a plurality of oil passage orifices.

16. The turbomachine according to claim 1, wherein the first shaft is a low pressure compressor shaft.

17. A method of mounting the aircraft turbomachine according to claim 1, comprising:
    connecting the second shaft, which is a fan shaft, to an output shaft of the reduction gear and axially engaging on fan shaft bearings and supports of the fan shaft bearings;
    engaging an input shaft axially inside the reduction gear until the first splines of the input shaft cooperate with splines of a sun gear of the reduction gear;
    securing the fan shaft, the output shaft, and the input shaft in an intermediate casing;
    mounting means for supplying oil to the fan shaft bearings, and
    engaging the first shaft by axial translation in the input shaft until they are coupled by the second and third splines and fixing the supports of the fan shaft bearings to the intermediate casing.

18. The turbomachine according to claim 1, wherein said second elastically deformable means are located upstream of the reduction gear.

19. The turbomachine according to claim 1, wherein the entire axial extent of the input shaft surrounds said first shaft.

20. The turbomachine according to claim 1, wherein said second splines are located at an upstream end of the input shaft and said third splines are located at an upstream end of the first shaft.

21. The turbomachine according to claim 1, wherein said second splines and said third splines are located upstream of said second elastically deformable means, wherein said second elastically deformable means are located upstream of the reduction gear.

* * * * *